2,835,696

ESTERS OF CARBOCYCLIC 1,2-DICARBOXYLIC ACIDS AND METHOD OF MAKING THE SAME

Alfred F. Steinhauer, Midland, Mich., assignor to The Dow Chemical Company, Midland, Mich., a corporation of Delaware No Drawing. Application July 28, 1955
Serial No. 525,070

11 Claims. (Cl. 260—468)

This invention concerns certain new unsymmetrical esters of carbocyclic 1,2-dicarboxylic acids, which esters have the general formula:

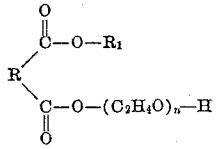

wherein R represents a carbocyclic ring containing 6 carbon atoms and is a nucleus of a carbocyclic 1,2-dicarboxylic acid selected from the group consisting of phthalic acid, 4-cyclohexene-1,2-dicarboxylic acid and hexahydrophthalic acid, $R_1$ represents an alkyl radical containing from 8 to 18 carbon atoms and $n$ is a whole number from 7 to 110.

The new esters range from clear mobile liquids to wax-like solids and have a molecular weight within the range of from 580 to 6000. They are all soluble in water. The new esters are useful as surface active agents, e. g. as wetting agents, emulsifying agents, or foaming agents. They are useful for dispersing finely divided solids, or water-immiscible organic liquids in aqueous solutions, e. g. in the preparation of agricultural spray compositions. The products of the invention are also useful as the active ingredient in the manufacture of synthetic detergents and washing powders.

The new unsymmetrical esters can be prepared by reacting a saturated aliphatic alcohol containing from 8 to 18 carbon atoms in the molecule with a molecular equivalent amount of a carbocyclic 1,2-dicarboxylic acid such as phthalic acid, 4-cyclohexene-1,2-dicarboxylic acid (tetrahydrophthalic acid) or hexahydrophthalic acid, or an anhydride of such acid, to obtain a corresponding monoalkyl ester of said acid and reacting the monoalkyl ester with a polyethylene glycol having a molecular weight of at least 300, preferably from 400 to 5000, or with ethylene oxide in amount corresponding to from 7 to 110 moles of the ethylene oxide per mole of the monoalkyl ester starting material. The mixed esters may also be prepared by reaction of an acyl halide of the monoalkyl ester starting material and a polyethylene glycol.

The monoalkyl ester starting material can readily be obtained by reaction of equimolecular proportions of a saturated aliphatic alcohol containing from 8 to 18 carbon atoms in the molecule with phthalic anhydride, tetrahydrophthalic anhydride, or hexahydrophthalic anhydride, at temperatures of from about 100° to 120° C., employing a procedure similar to that disclosed for the preparation of sec.-octyl hydrogen phthalate, described in Organic Syntheses, collective vol. 1, page 418 (1921).

An acyl halide of such carbocyclic 1,2-dicarboxylic acid monoalkyl ester starting material can be prepared by reaction of the monoalkyl ester and thionyl chloride in usual ways, e. g. by heating the monoalkyl ester to reaction temperatures of from 60° to 70° C. and adding the thionyl chloride slowly with stirring while venting volatile byproducts from the reaction, or by reaction of phosphorus trichloride with the monoalkyl ester in known ways.

As the polyethylene glycol reactant there may be employed a polyethylene glycol having a molecular weight of at least 300, preferably a molecular weight of from 400 to 5000. Linear polyethylene glycols ranging from clear mobile liquids to wax-like solids are known. The polyethylene glycols are usually referred to as having given, or average, molecular weights. It is understood that the product stated to have a given molecular weight usually consists of a mixture of polyethylene glycols of different chain lengths having molecular weights ranging from somewhat below to somewhat above the average value. The molecular weight is that of the mass as determined by test, and is an average value.

The new unsymmetrical esters of the invention can be prepared by reaction of the monoalkyl ester starting material and a polyethylene glycol in the presence of an esterification catalyst such as sulfuric acid, or benzene sulfonic acid, or by reaction of an acyl halide of the monoalkyl ester and the polyethylene glycol in usual ways. The reaction can be carried out in a water immiscible inert solvent such as toluene, ethylbenzene or diethylbenzene, but a solvent is not required. The unsymmetrical esters are preferably prepared by reacting ethylene oxide with the monoalkyl ester starting material in the presence of an alkaline catalyst.

In a preferred practice, a monoalkyl ester of phthalic acid, tetrahydrophthalic acid (4-cyclohexene-1,2-dicarboxylic acid), or hexahydrophthalic acid, which monoalkyl ester contains from 8 to 18 carbon atoms in the alkyl radical, together with a small amount, e. g. from 0.4 to 2 percent by weight, of a strongly alkaline catalyst such as sodium hydroxide or potassium hydroxide is placed in a suitable reaction vessel. The mixture is stirred and heated to reaction temperatures of from 120° to 140° C. Ethylene oxide is introduced, preferably under superatmospheric pressures of from 5 to 50 pounds per square inch gauge pressure, at approximately the rate at which it is consumed in the reaction and in amount corresponding to from 7 to 110 moles of the ethylene oxide per mole of the monoalkyl ester starting material. The alkaline catalyst may be added all at once to the monoalkyl ester starting material or added portion-wise during the carrying out of the reaction. The monoalkyl ester starting material and the ethylene oxide, together with an alkaline catalyst such as potassium hydroxide or sodium hydroxide, may be mixed with one another in the desired proportions at room temperature or below, and the mixture fed to a reaction zone, wherein it is heated at temperatures between 120° and 140° C., under pressure to effect a reaction between the ethylene oxide and the monoalkyl ester starting material to obtain the unsymmetrical ester products, after which the reacted mixture is usually cooled and discharged from the reaction zone.

The reaction can be carried out in continuous manner by concurrently feeding the monoalkyl ester starting material, the ethylene oxide and an alkaline catalyst, e. g. potassium hydroxide, into admixture with one another in a reaction zone such as tubular vessel or coil, wherein the mixture is heated at temperatures between 120° and 140° C. under pressure, for a time sufficient to complete the reaction, and continuously withdrawing the reacted mixture from said reaction zone.

The product, i. e. the reacted mixture thus obtained, is usually an alkaline to neutral composition suitable for use without further treatment, although it may be treated with a decolorizing agent such as animal charcoal, or fuller's earth, after which the product is separated from the solid material in usual ways, e. g. by filtering, The reacted mixture is usually made neutral and vacuum stripped, i. e. heated to temperatures of from 140° to 150° C. under an absolute pressure of 25 millimeters, or less, to distill and separate volatile ingredients such as traces of unreacted ethylene oxide, monoalkyl ester, or water, from the product.

The following examples illustrate ways in which the principle of the invention has been applied, but are not to be construed as limiting its scope.

*Example 1*

A mixture of 35.3 grams (0.1 mole) of dodecyl ortho-chloroformyl benzoate and 40 grams of a polyethylene glycol having an average molecular weight of 400, was placed in a glass reaction flask equipped with a reflux condenser and stirrer. The mixture was stirred and heated at temperatures of from 70°–80° C. over a period of 45 minutes. HCl formed in the reaction was vented through the reflux condenser. There was obtained dodecyl polyethylene glycol phthalic ester as a clear colorless liquid. The product is soluble in water and has the probable formula:

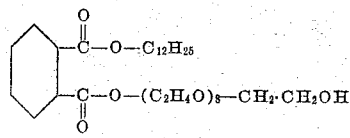

Surface active properties for the product were determined on an aqueous solution of distilled water containing 0.1 percent by weight of said product. The procedure for determining the amount of foam was similar to the Ross-Miles foam test. The wetting time was determined by the Draves-Clarkson sinking time test. The surface tension for an aqueous solution of distilled water containing 0.1 percent by weight of the product was determined at 25° C. employing a standard tensiometer. The product had the surface active properties:

Foam height _____ mm__ 19
Wetting time _____ min__ 1.24
Surface tension (aqueous) _____ dynes/sq. cm__ 30.9

*Example 2*

In each of a series of experiments, a mixture of approximately equimolecular proportions of dodecyl ortho-chloroformyl benzoate and a polyethylene glycol having an average molecular weight as stated in the following table, was placed in a glass reaction vessel equipped with a reflux condenser and stirrer. The mixture was stirred and heated at temperatures of from 70°–80° C. over a period of approximately one hour. HCl was vented from the reaction mixture as it was formed. The product was removed from the vessel and cooled to room temperature. A portion of each product was tested for surface active properties by procedures similar to those employed in Example 1. The table identifies each product by giving the weight in grams of the starting materials used in preparing the same. The table gives the physical form of each product, i. e. whether liquid or solid, and the surface active properties determined for each product.

*Example 3*

A mixture of 50 parts by weight of dodecyl hydrogen phthalate, i. e. the mono-dodecyl ester of phthalic acid, and 90 parts of a polyethylene glycol having an average molecular weight of 600, together with 0.2 part of concentrated sulfuric acid as catalyst, was heated at a temperature of 150° C., at an absolute pressure of 2 millimeters, for a period of 6 hours, while withdrawing vapors of water from the reaction as it was formed. The reaction mixture was cooled and neutralized with sodium hydroxide. The product was a pale yellow liquid. It was soluble in water. Surface active properties for the product were determined by procedures similar to those employed in Example 1. The product had the surface active properties:

Foam height _____ mm__ 25
Wetting time _____ min__ 1
Surface tension (aqueous) _____ dynes/sq. cm__ 30.3

*Example 4*

A mixture of 50 grams of sec.-octyl hydrogen phthalate and 108 grams of a polyethylene glycol having an average molecular weight of 600, together with 0.3 gram of concentrated sulfuric acid as catalyst, was reacted by heating the same at a temperature of 150° C. at an absolute pressure of 2 millimeters for a period of 6 hours. The product was cooled and neutralized with sodium hydroxide. It was a yellow liquid. Surface active properties for the product were determined by procedures similar to those employed in Example 1. The product had the surface active properties:

Foam height _____ mm__ 45
Wetting time _____ min__ 3.5
Surface tension (aqueous) _____ dynes/sq. cm__ 33.9

*Example 5*

A mixture of 50 grams of octadecyl ortho-chloroformyl benzoate and 456 grams of a polyethylene glycol having an average molecular weight of 4000 was heated at temperatures of from 70°–80° C. over a period of one hour. HCl was vented from the reaction mixture as it was formed. The product was a yellow solid. It was soluble in water. Surface active properties for the product were determined by procedures similar to those employed in Example 1. The product had the surface active properties:

Foam height _____ mm__ 22
Wetting time _____ min__ 15
Surface tension (aqueous) _____ dynes/sq. cm__ 42

*Example 6*

A charge of 8 pounds of dodecyl hydrogen phthalate, together with 0.5 percent by weight of potassium hydroxide, was placed in a stainless steel pressure resistant vessel. The mixture was stirred and heated to a temperature of 120° C. Ethylene oxide was added under pressures of up to 50 pounds per square inch gauge pressure while heating the mixture at reaction temperatures between 120° and 138° C. over a period of 5 hours. A total of 15.7 pounds of ethylene oxide was consumed

| Run No. | Starting Materials | | | Product | | | |
|---|---|---|---|---|---|---|---|
| | Dodecyl o-chloro-formyl Benzoate, gms. | Polyethylene Glycol | | Form | Surface Active Properties | | |
| | | gms. | Mol. Wt. | | Foam Height, mm. | Wetting Time, min. | Surface Tension, dynes/sq. cm. |
| 1 | 35.3 | 60 | 600 | Clear Liquid | 25 | 1.2 | 30.4 |
| 2 | 35.3 | 100 | 1,000 | Soft White Solid | 35 | 1.5 | 29.5 |
| 3 | 20.3 | 115.4 | 2,000 | Waxy White Solid | 58 | 4.7 | 30.4 |
| 4 | 20 | 227 | 4,000 | Wax-like Solid | 54 | 7.0 | 31.3 | in the reaction. The mixture was neutralized with aqueous 1-normal hydrochloric acid solution, then heated at temperatures between 120° and 125° C. at absolute pressures of from 10 to 20 millimeters to remove volatile components. Thereafter, it was cooled and removed from the vessel. The product was a dark brown liquid. It was soluble in water. Surface active properties were determined for the product by procedures similar to those employed in Example 1. The product had the surface active properties:

Foam height _____ mm__ 53
Wetting time _____ min__ 0.9
Surface tension (aqueous) _____dynes/sq. cm__ 32.2

*Example 7*

A charge of 8.75 pounds of a batch of dodecyl hydrogen phthalate, together with 0.5 percent by weight of potassium hydroxide as catalyst, was placed in a stainless steel reaction vessel. The mixture was stirred and heated at temperatures between 120° and 138° C., while adding 15.75 pounds of ethylene oxide at pressures of up to 50 pounds per square inch gauge pressure over a period of 5 hours. The dodecyl hydrogen phthalate employed in the reaction was prepared by heating a mixture of 26.5 pounds of phthalic anhydride and 35 pounds of a commercial grade of dodecyl alcohol at temperatures of from 105°–110° C. for a period of 5 hours. After adding the 15.75 pounds of ethylene oxide to the dodecyl hydrogen phthalate starting material, the mixture was neutralized and devolatilized, then cooled and removed from the reaction vessel. The produce was a dark brown liquid. It was soluble in water. A portion of the product was mixed with 5 percent by weight of fuller's earth. The mixture was stirred and heated at a temperature of 100° C. for a period 5 hours, then filtered. The treated product was a pale yellow liquid. Surface active properties were determined for the treated product by procedures similar to those employed in Example 1. The product had the surface active properties:

Foam height _____ mm__ 52
Wetting time _____ min__ 1.1
Surface tension (aqueous) _____dynes/sq. cm__ 32.2

*Example 8*

A charge of 7 pounds of the batch of the dodecyl hydrogen phthalate described in Example 7, was reacted with 19 pounds of ethylene oxide in the presence of 0.5 percent by weight of potassium hydroxide as catalyst by procedure similar to that described in Example 7. The product was a dark brown viscous liquid. It was soluble in water. Surface active properties were determined for the product by procedures similar to those employed in Example 1. The product had the surface active properties:

Foam height _____ mm__ 59
Wetting time _____ min__ 1.2
Surface tension (aqueous) _____dynes/sq. cm__ 33.1

*Example 9*

Ethylene oxide in amount of 17.2 pounds was reacted with 8 pounds of sec.-octyl hydrogen phthalate in the presence of potassium hydroxide as catalyst by procedure similar to that described in Example 7. The product was a dark brown liquid. It was soluble in water. Surface active properties were determined for the product by procedures similar to those employed in Example 1. The product had the properties:

Foam height _____ mm__ 77
Wetting time _____ min__ 1.2
Surface tension (aqueous) _____dynes/sq. cm__ 32.2

The sec.-octyl hydrogen phthalate employed in the experiment was prepared by heating a mixture of equimolecular proportions of phthalic anhydride and a commercial grade of sec.-octyl alcohol (capryl alcohol) at temperatures between 105°–115° C. for a period of 8 hours.

*Example 10*

A mixture of 304.2 grams (2 moles) of tetrahydrophthalic anhydride (4-cyclohexene 1,2-dicarboxylic acid anhydride) and 391.6 grams (2 moles) of a commercial grade of dodecyl alcohol was heated at reaction temperatures of from 105° to 110° C., with stirring for a period of 5 hours, then cooled to room temperature. The dodecyl(lauryl) hydrogen tetrahydrophthalate was obtained as a white wax-like product.

A charge of 670.8 grams of the dodecyl hydrogen tetrahydrophthalate was placed in a glass reaction flask equipped with a reflux condenser and stirrer. The mixture was heated to temperatures of from 60°–70° C. and stirred. Thereafter, 231 grams of thionyl chloride was slowly added. The resulting mixture was stirred and heated at temperatures between 60° and 70° C., over a period of 2 hours, while venting volatile by-products, e. g. $SO_2$ and HCl, through the reflux condenser. The mixture was cooled to room temperature and stirred for a period of 4 hours. The 1-dodecyl-2-chloroformyl 4-cyclohexene carboxylate, i. e. the acyl halide of the monododecyl ester of tetrahydrophthalic acid, was obtained as a light brown-colored liquid.

A mixture of 12.2 grams of the 1-dodecyl-2-chloroformyl 4-cyclohexene carboxylate prepared above and 20 grams of a polyethylene glycol having an average molecular weight of 600, was placed in a reaction flask equipped with a reflux condenser and stirrer. The mixture was stirred and heated at temperatures of from 70° to 80° C. over a period of 3 hours, then cooled. HCl formed in the reaction was vented through the reflux condenser. The 1-dodecyl-2-polyethylene glycol tetrahydrophthalic acid ester was obtained as a yellow liquid. It has the probable formula:

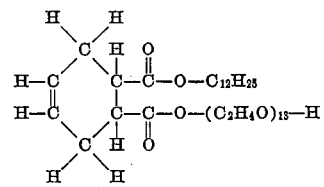

The product was soluble in water. It had good emulsifying properties. Surface active properties for the product were determined by procedures similar to those employed in Example 1. The product had the surface active properties:

Foam height _____ mm__ 24
Wetting time _____ min__ 1.12
Surface tension (aqueous) _____dynes/sq. cm__ 31.3

*Example 11*

A mixture of 12.1 grams of a batch of dodecyl orthochloro-formyl benzoate and 100 grams of a polyethylene glycol having an average molecular weight of 300, was placed in a glass reaction flask equipped with a reflux condenser and stirrer. The mixture was stirred and heated at temperatures of from 80° to 90° C. over a period of three hours, then cooled. Hydrogen chloride formed in the reaction was vented through the reflux condenser. The product was a clear liquid. It was soluble in water and had good emulsifying properties. The surface active properties for the product were determined by procedures similar to those employed in Example 1. The product had the surface active properties:

Foam height _____ mm__ 5
Wetting time _____ min__ 2.15
Surface tension (aqueous) _____dynes/sq. cm__ 31.6

In contrast, the reaction product of a similar portion of the batch of the dodecyl ortho-chloro-formyl benzoate and a polyethylene glycol having an average molecular weight of 200, was insoluble in water.

I claim:

1. A water-soluble composition comprising an unsymmetrical ester of a carbocyclic 1,2-dicarboxylic acid selected from the group consisting of phthalic acid and hydrogenated phthalic acids having from 8 to 10 hydrogen atoms on the benzene nucleus, wherein one of the carboxyl groups of said acid is esterified with a saturated aliphatic alcohol containing from 8 to 18 carbon atoms in the molecule and the other carboxyl group is esterified with a linear polyethylene glycol having a molecular weight between 300 and 5000.

2. A water-soluble composition comprising an unsymmetrical ester of a carbocyclic 1,2-dicarboxylic acid, which ester has the general formula:

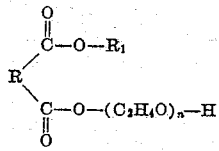

wherein R represents a carbocyclic ring containing 6 carbon atoms and is a nucleus of a carbocyclic 1,2-dicarboxylic acid selected from the group consisting of phthalic acid and hydrogenated phthalic acids containing from 8 to 10 hydrogen atoms on the benzene nucleus, $R_1$ represents an alkyl radical containing from 8 to 18 carbon atoms and $n$ is a whole number from 7 to 110.

3. A water-soluble composition comprising an ester of phthalic acid having the general formula:

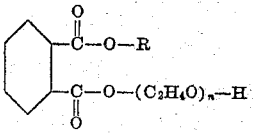

wherein R represents an alkyl radical containing from 8 to 18 carbon atoms and $n$ is a whole number from 7 to 110.

4. A water-soluble composition comprising an ester of 4-cyclohexene-1,2-dicarboxylic acid having the general formula:

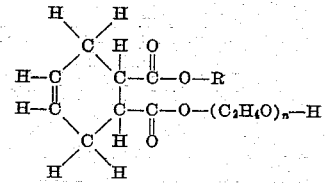

wherein R is an alkyl radical containing from 8 to 18 carbon atoms and $n$ is a whole number from 7 to 110.

5. A water-soluble composition comprising an ester of dodecyl hydrogen phthalate having the general formula:

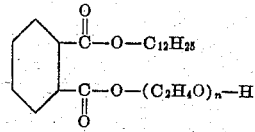

wherein $n$ is a whole number from 7 to 110.

6. A water-soluble composition comprising an ester of dodecyl hydrogen phthalate and a polyethylene glycol having an average molecular weight of 600.

7. A water-soluble composition comprising an ester of dodecyl hydrogen phthalate and a polyethylene glycol having an average molecular weight of 1000.

8. A water-soluble composition comprising an ester of dodecyl hydrogen phthalate and a polyethylene glycol having an average molecular weight of 2000.

9. A water-soluble composition comprising an ester of an octyl hydrogen phthalate and a polyethylene glycol having an average molecular weight of 600.

10. A water-soluble composition comprising an ester of octadecyl hydrogen phthalate and a polyethylene glycol having an average molecular weight of 4000.

11. A method of making a water-soluble ester composition which comprises condensing from 7 to 110 molecular proportions of ethylene oxide with one molecular proportion of a monoalkyl hydrogen ester of a carbocyclic 1,2-carboxylic acid which monoalkyl hydrogen ester has the general formula:

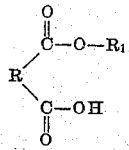

wherein R represents a carbocyclic ring containing 6 carbon atoms and is a nucleus of a carbocyclic 1,2-dicarboxylic acid selected from the group consisting of phthalic acid and hydrogenated phthalic acids having from 8 to 10 hydrogen atoms on the benzene nucleus, and $R_1$ represents an alkyl radical containing from 8 to 18 carbon atoms, at temperatures between 120° and 140° C. by feeding the ethylene oxide into admixture with the monoalkyl hydrogen ester in the presence of an alkaline catalyst under a superatmospheric pressure of from 5 to 50 pounds per square inch at approximately the rate at which the ethylene oxide is consumed in the reaction.

References Cited in the file of this patent

UNITED STATES PATENTS

| | | |
|---|---|---|
| 1,883,182 | Webel | Oct. 18, 1932 |
| 2,480,185 | Fife et al. | Aug. 30, 1949 |
| 2,562,878 | Blair | Aug. 7, 1951 |

UNITED STATES PATENT OFFICE
CERTIFICATE OF CORRECTION

Patent No. 2,835,696 May 20, 1958

Alfred F. Steinhauer

It is hereby certified that error appears in the printed specification of the above numbered patent requiring correction and that the said Letters Patent should read as corrected below.

Column 6, line 58, for "100 grams" read --10 grams--.

Signed and sealed this 14th day of October 1958.

(SEAL)
Attest:
KARL H. AXLINE
Attesting Officer

ROBERT C. WATSON
Commissioner of Patents